United States Patent [19]

Klosin

[11] Patent Number: 4,837,409

[45] Date of Patent: Jun. 6, 1989

[54] SUBMERISIBLE INSULATED SPLICE ASSEMBLIES

[75] Inventor: John J. Klosin, Ormond Beach, Fla.

[73] Assignee: Homac Mfg. Company, Ormond Beach, Fla.

[21] Appl. No.: 858,564

[22] Filed: Mar. 2, 1984

[51] Int. Cl.⁴ .......................................... H02G 15/117
[52] U.S. Cl. ................................ 174/88 R; 174/74 A; 174/84 R; 174/84 C
[58] Field of Search ................. 174/84 R, 84 C, 88 R, 174/135, 74 A, 93; 339/115 R, 116 R, 116 C, 213 R, 213 T; 439/199, 519, 521, 738

[56] References Cited

U.S. PATENT DOCUMENTS

| | | | |
|---|---|---|---|
| 2,098,091 | 11/1937 | Gamble | 339/116 R |
| 2,946,839 | 7/1960 | Horning | 339/213 R |
| 3,009,986 | 11/1961 | Stephens | 174/84 C |
| 3,274,330 | 9/1966 | Becker et al. | 174/84 R |
| 3,502,790 | 3/1970 | Cain et al. | 174/77 R |
| 3,770,876 | 11/1973 | Post | 174/88 R |
| 4,063,793 | 12/1977 | Judd | 339/213 R X |
| 4,234,757 | 11/1980 | Simons | 174/73 R |
| 4,266,992 | 5/1981 | Agaisse | 174/84 C X |
| 4,283,597 | 8/1981 | Cooper, Jr. | 339/213 R |

FOREIGN PATENT DOCUMENTS

| | | | |
|---|---|---|---|
| 2528307 | 1/1977 | Fed. Rep. of Germany | 174/113 R |
| 625613 | 6/1949 | United Kingdom | 174/113 R |
| 1435560 | 5/1976 | United Kingdom | 174/93 |

*Primary Examiner*—Morris H. Nimmo
*Attorney, Agent, or Firm*—John E. Benoit

[57] ABSTRACT

A resilient open ended reenterable splice cover is provided having an enlarged central section and cable sealing means at both ends with the central section having a cross-sectional area smaller than the cross-sectional area of the metal splice which it is designed to cover. Even though an interference fit is provided between the splice and the splice cover, the cover is removable so as to provide reentry to the splice. A lubricating medium is contained within the splice cover. The splice cover may be provided in a kit which includes a mating deformable metal splice or terminal. The kit is designed to be used in the field so as to provide a submersible reenterable splice assembly for insulated electric cables. In the preferred embodiment, the lubricating medium is a removable absorbent material having friction reducing material saturated therein whereby, when the absorbent means is removed from the splice cover, a portion of the friction reducing material is left within the splice cover so that after the splice is in place the splice cover may easily be moved into a position covering the splice and the cables with an interference fit so as to promote heat dissipation about the splice. In a further embodiment, a liquid lubricator may be contained within the cover which has removable plugs at either end. The assembly may be used with both single cables splices and multiple cable splices as well as with splices having fuses associated therewith. It is again emphasized that the cover is removable due to the friction reducing material so as to provide reentry to the splice.

15 Claims, 4 Drawing Sheets

SUBMERISIBLE INSULATED SPLICE ASSEMBLIES

The present invention relates to splice assemblies and more particularly to submersible splice assemblies for secondary voltage applications which also have heat dissipating qualities.

In normal practice, electrical cable splices are insulated. When the splices are to be designed for underground systems, it is imperative that they be insulated watertight and that the splice insulation be of adequate thickness to prevent short circuiting between adjacent cables of opposite polarity.

Standard practice in splicing insulated cable is to insulate splices to restore the insulation removed in making the splice. The thickness of the insulation on secondary voltage cables having a maximum rating of 600 volts is determined by cable size. As examples, standard insulation for #6 stranded cable having a bare diameter of 0.184 inches is 0.062 inches, while the insulation on a 2000 MCM cable having a bare diameter of 1.412 is 0.125 inches. While, in those countries using the metric system, the voltage class is 1000 volts maximum instead of 600 volts maximum, a similar escalation in cable thickness based on cable size is followed.

Since the dielectric strength of rubber and plastic cables used in secondary voltage applications are similar, rubber splice covers must be designed with wall thicknesses equal to or greater than the maximum cable accommodated, thus restoring the electrical integrity of the insulation in the splice area.

Splice covers must also be designed to restore the mechanical strength of the cable insulation to withstand field conditions, such as the abrasion involved in pulling cable through trenches and conduit, and the rough treatment inherent in the necessary bending and twisting of cables.

Accordingly, the basic design criteria for splice covers has been to restore the electrical and mechanical characteristics of the cable in the splice area, and to seal the assembly water tight.

A further requirement has recently developed due to modern usage. Electric utilities, responding to the accelerated demand for more electricity, have increased the ampacity of their lines, thus causing a corresponding increase in the temperature rise in the cable and in the surrounding splices.

Insulated cables, due to advances in insulation technology, are rated for constant operation at 90° centigrade. Accordingly, the above mentioned increases in temperature rise are tolerable where the cable itself is concerned. It is important to note that insulated cables accommodate higher ampacities because the heat generated in the cables is absorbed by conduction into the surrounding insulation and thus dissipated to the ambient air. Unless the splice cover is designed to function as efficiently as the insulated cable in absorbing the heat generated by the maximum rating of the cable, splice failure at elevated temperatures described is probable.

Yet a further requirement of premolded splice covers is that they be reenterable. This is required for inspection, and for electrical testing to determine the location of outages. It is also an essential requirement where splices include fusible devices.

Premolded splice covers in present usage, designed primarily to accommodate cables operating at lower constant temperatures, i.e. 50° C., do not provide for the absorption of heat at temperatures up to the cable ratings of 90° C. Typical premolded splice covers available are described as follows:

1. A three piece assembly including a length of rigid PVC tubing for housing the splice, with two molded rubber sealing glands designed to seal the juncture with the PVC tubing and to seal the cable insulation at each end. The PVC tubing has a constant inside and outside diameter. The sealing glands are selectively sized to suit the cable insulation diameter. A range of cables from #6 stranded include 0.309 inches over insulation to 4/0 and 0.684 inches over insulation which are assembled in the same housing.

While the PVC tubing conducts some heat, it also reflects heat so little total heat dissipation is available.

Replacing the PVC tube with a rubber housing having a higher thermal conductivity does not improve performance. The housing is designed to provide clearance for the various size splices installed. Since splices are sized to the cables installed, the clearance for the minimum size spliced in the cable range would be greatest, while the clearance for the maximum size splice would be the smallest. Irrespective of splice size, a cylinder of air is developed between splice and housing, causing a containment of heated air.

Comparison of the thermal conductivity of air with that of rubber, based on calories per centimeter per degrees C. indicates $54 \times 10^{-6}$, for air and $400 \times 10^{-6}$ for rubber, a ratio of nearly 8 to 1. This establishes the necessity of substantially eliminating the presence of air between splice and splice cover in order to equal the thermal conductance of an insulated cable. Accordingly, the typical splice cover described could not provide the thermal conductance necessary to equal that of the cable.

2. A splice cover such as that indicated by Becker, et al, U.S. Pat. No. 3,274,330.

This patent discloses a means for insulating a splice by rolling an elastomeric tube outward from the center of a splice to cover the splice and portions of the cable insulation at each end. To accomplish this purpose the thickness of the tubing must be minimal, i.e. 0.020 or 0.030 inches thickness. Elastomeric tubing in the thicknesses required to restore the electrical and mechanical properties of cable insulation, i.e. 0.062 to 0.125 inches, could not be rolled up centrally on the splice without splitting or without destroying its resilience. The minimal thicknesses essential to the functioning of this splice cover also fails to restore the mechanical integrity of the cable.

Splice covers utilizing heat shrinkable tubing restore the mechanical and electrical characteristics of the cable insulation in the splice area. These are described in various patent disclosures such as Wetmore U.S. Pat. Nos. 3,243,211 and 3,297,819 and Kierstad U.S. Pat. No. 3,891,790.

While heat shrinkable splice covers effectively accomplish the basic thermal conductance requirements, they require special training of splicing crews in the manipulation of blow torches and similar flame or heat producing devices to prevent damage to both the cable insulation and the splice cover. Further, the open flame technique, most commonly utilized in heat shrink splice installations, is limited in use in many urban electrical systems where gas mains are in close proximity to electrical wiring.

Heat shrinkable splice covers are not reenterable without destruction, so they do not provide easy access to the bare splice assembly for inspection or testing. Further, they are not applicable to splice assemblies that include fuses or limiters which must be replaced as required.

Splice covers as disclosed in Sievert U.S. Pat. No. 3,515,798 also successfully restore the mechanical and electrical characteristics of the cable insulation in the splice area. A tubular elastic sleeve is pre-stretched during manufacture to a diameter larger than the splice to be covered and a spiral restraining core is inserted to maintain the splice cover in the prestretched condition. At assembly the spiral core is removed to allow the splice cover to resume its initially determined diameter, thus effecting a sealed assembly.

While the basic requirements for restoration of the electrical and mechanical characteristics of the cable are met in this design, this splice cover, like heat shrinkable splice covers, is not reenterable without destruction.

Accordingly, an object of this invention is to provide a splice cover which is premolded and which tightly covers the splice so as to provide a heat transfer function.

A further object is to provide a premolded splice cover which is easily applied in a tight interference fit without the need of heat shrinking.

Yet another object of this invention is to provide a premolded splice cover that may be used for multiphase installations.

Yet another object of the invention is to provide a premolded splice cover that absorbs heat generated by high capacities that is both reenterable and reusable.

A still further object of this invention is to provide splice covers for use in underground submersible applications having secondary voltages to 1000 volts.

These and other objects of the invention will become apparent from the following description when taken together with the drawings.

SUMMARY OF THE INVENTION

The present invention provides a resilient open ended reenterable splice cover having an enlarged central section and cable sealing means at both ends with the central section having a cross-sectional area smaller than the cross-sectional area of the metal splice which it is designed to cover. Accordingly, although an interference fit is provided between the splice and the splice cover, the cover is removable so as to provide reentry to the splice. A lubricating medium is contained within the splice cover. The splice cover may be provided in a kit which includes a mating deformable metal splice or terminal. The kit is designed to be used in the field so as to provide a submersible reenterable splice assembly for insulated electric cables. In the preferred embodiment, the lubricating medium is a removable absorbent material having friction reducing material saturated therein whereby, when the absorbent means is removed from the splice cover, a portion of the friction reducing material is left within the splice cover so that after the splice is in place the splice cover may easily be moved into a position covering the splice and the cables with an interference fit so as to promote heat dissipation about the splice. In a further embodiment, a liquid lubricator may be contained within the cover which has removable plugs at either end. The assembly may be used with both single cables splices and multiple cable splices as well as with splices having fuses associated therewith. It is again emphasized that the cover is removable due to the friction reducing material so as to provide reentry to the splice.

DETAILED DESCRIPTION OF THE INVENTION

The splice kits as described subsequently include three basic components. First, an aluminum or copper splice is provided with an outside diameter designed to suit the splice cover. Secondly, a splice cover which is basically smaller in cross-sectional area than the metal splice is supplied. Third, a lubricating medium is removably retained in the cover either as a liquid or through the use of sponge rubber or the like, saturated with the medium. Upon removal of the lubricating medium from the splice cover, the inside of the splice cover retains a coating of the friction reducing medium along all inner surfaces.

Figure 1:
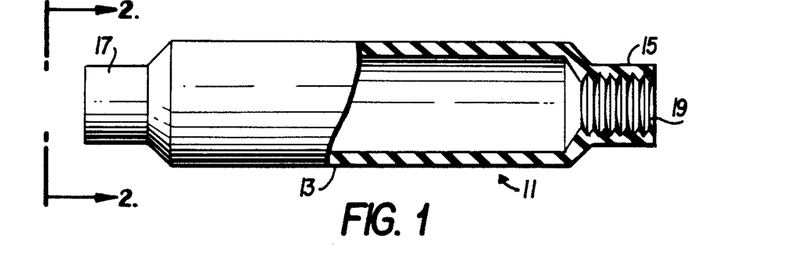
FIG. 1 is a partial sectional view of one embodiment of a splice cover used in the present invention.
Figure 2:
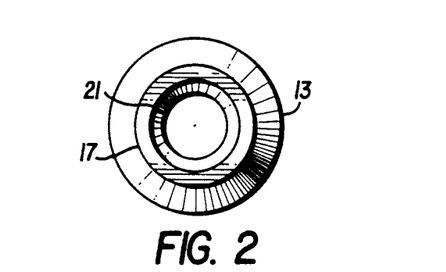
FIG. 2 is a cross-sectional line through lines 2—2 of FIG. 1.

Turning now to FIGS. 1 and 2, there is illustrated a preferred embodiment of the present invention which comprises a splice cover 11, of a material such as EPDM rubber, having an enlarged central section 13 and reduced end sections 15 and 17. The interior of the reduced section is provided with cable sealing grooves 19 so as to provide the water tight seal about the insulated cables.

Figure 3:
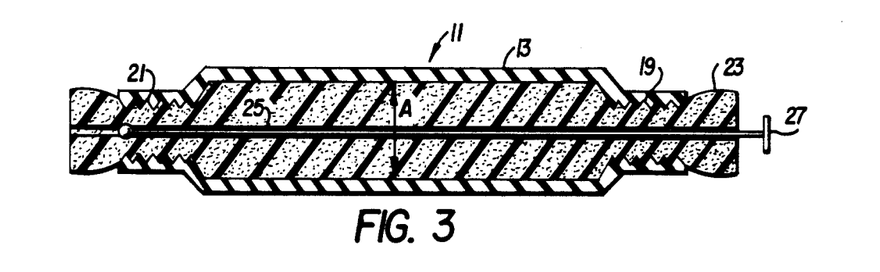
FIG. 3 is a sectional view of the splice cover of FIG. 1 having a removable absorbent material therein.

In FIG. 3, the splice cover 11 is shown with an absorbent medium 23 such as sponge rubber. This medium is saturated with silicon oil, low viscosity grease, or a similar friction reducing material before it is inserted in the splice cover 11. Any means may be used to insert absorbent material 23 into the splice cover. One means is shown whereby the material has a central borehole 25 and a tool 27 is inserted therethrough so as to push the material into and through the splice cover. Although the material could be totally enclosed by the splice cover, this would require some extra type of tool to remove it. Accordingly, part of the material preferably protrudes at least from one end of the splice cover and, as shown in the example of FIG. 3, may protrude from both ends.

Figure 4:
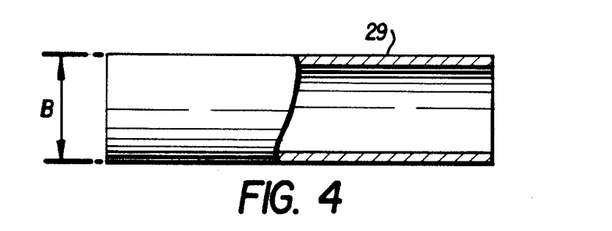
FIG. 4 is a partial sectional view of a standard compressible metal splice.

FIG. 4 is a partial sectional view of a standard type of splice which is normally made of aluminum or copper. In the present invention, in order to maximize the heat transfer away from the splice, the cross-sectional area and, in the case of a circular splice, the outer diameter B, is greater than the cross-sectional area, and in the case of a tubular splice cover the inner diameter A, of splice cover 11. This insures an interference fit substantially over the entire contacting surface between the splice and the cover so as to provide a maximum heat transfer away from the splice.

During the assembly, the following steps are taken. First, the sponge-like material 23 is removed from the splice cover. The installing area on the cable insulation ends and on the splice may then be coated with the friction reducing material through application by sponge-like material 23. Splice cover 11 is then slipped over one of the cables and beyond the cable end which is to be spliced. Due to the lubricating material, even though the reduced end sections are of a tight enough fit to provide a water tight seal, the sleeve may be moved with ease over the outer insulation of the cable.

The aluminum or copper splice is then installed in a normal fashion on the bared cable ends. The splice cover is then moved so as to be in a position over the splice in a tight interference fit with the reduced diameter end seals sealing the sleeve about the insulated cables. When reentry is required, the sleeve may be moved onto the cable and away from the splice due to the presence of the friction reducing material.

Figures 4, 5:
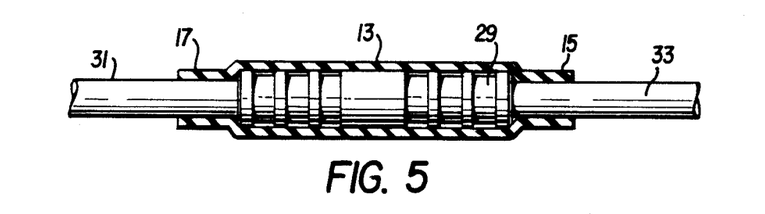
FIG. 5 is a partial sectional view of the splice and splice cover and connecting cables.

As can be seen from FIG. 5, when the splice cover is in position, because it is of a resilient material and because the interior diameter is smaller than the exterior diameter of the splice, the cover encompasses the splice with an interference fit. With such a fit, the splice cover acts in a manner to dissipate heat from the splice itself. Such heat dissipation is greatly reduced if the splice cover is not in contact with the splice.

Various modifications may be made relative to the molding of the splice cover in order to enhance the heat dissipating characteristics of the splice cover.

Figures 6, 7:
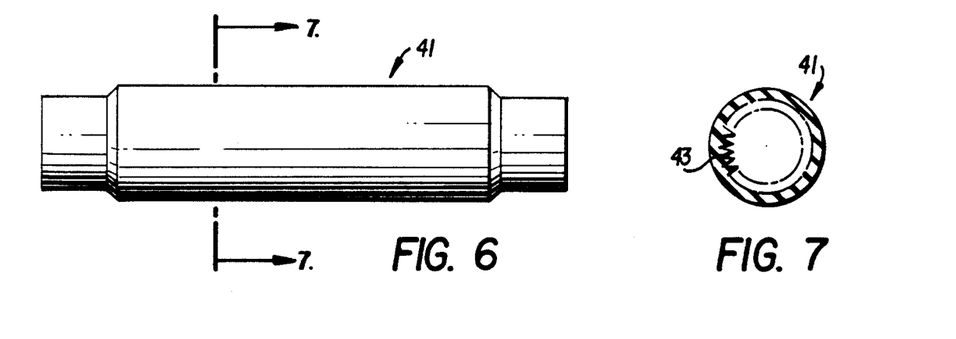
FIG. 6 is a elevational view of a modification of the splice of FIG. 1.
FIG. 7 is a sectional view through the lines 7—7 of FIG. 6.

FIGS. 6 and 7 disclose a splice cover 41 which is substantially the same as the splice cover of FIG. 1 as far as the exterior configuration is concerned. However, as can be seen in FIG. 7, a multiplicity of tines 43 are molded about the inside diameter of splice cover 41 so as to increase the interference fit against the splice without substantially increasing the effort to install the assembly. The tines, being pliable, also enter the irregular surfaces of the splice caused by the compression action while placing the splice on the cables. This increases the heat transfer by further eliminating air voids. While it is preferable that the tines extend longitudinally along the length of the cover, they could also extend radially within the cover. In either case, it is to be understood that the internal diameter between the root of the tines is less than the external diameter of the splice.

Figure 8:
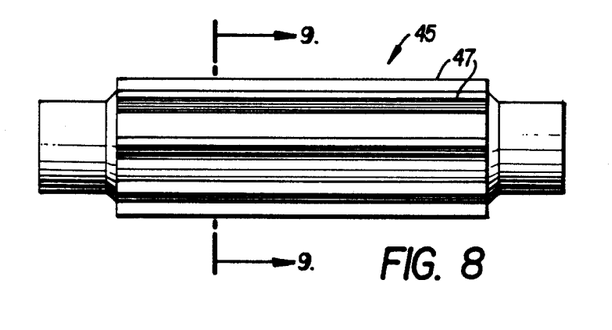
FIG. 8 is an elevational view of a further modification of the splice of FIG. 1.
Figure 9:
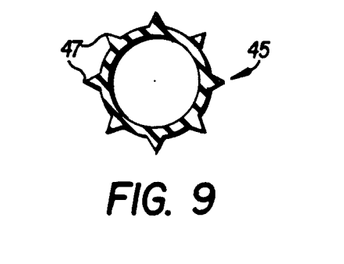
FIG. 9 is a sectional view through the lines 9—9 of FIG. 8.

In FIGS. 8 and 9, splice cover 45 includes a substantially smooth inside diameter. However, the outside periphery includes ribs 47 that substantially traverse the length of the splice cover so as to increase the surface area to provide a greater heat dissipation surface.

It is to be understood that the splice cover configurations of FIG. 6 and 8 may be used as shown or they may both be used with the same splice cover.

It is further to be understood that the sponge-like lubricated medium may be of sponge rubber or of other rubber compositions having good absorbent qualities. It could also be produced from absorptive thermoplastic materials. In view of the nature of the splice cover, the configuration of the absorbent material is preferably round but may be of any geometric configuration so long as contact is assured about the interior of the cover. The lubricating vehicle may be silicone oil, low viscosity grease, or a similar friction reducing material.

Figure 10:
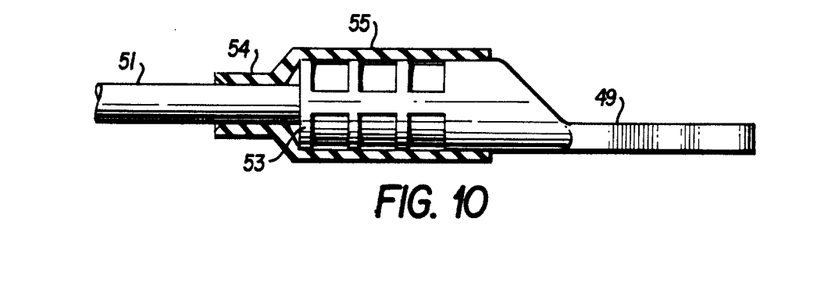
FIG. 10 is a modification of the splice cover of the present invention as used with a terminal and single cable.

FIG. 10 discloses a terminal cover 55 which is designed similar to the previously described splice covers except that it only has one cable sealing end 54 as required for use with terminal 49. Again, it should be noted that the present method of sealing terminals is the use of heat shrink tubing as previously described which prevents reentry of the terminal without destruction of the terminal cover.

Figure 11:
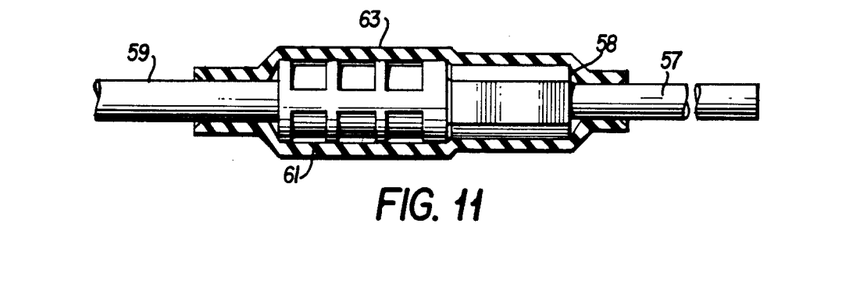
FIG. 11 is a modification of a splice cover of FIG. 1 as used with a pin terminal.

FIG. 11 discloses splice cover 63 for interconnecting pin terminal 57 with cable 59. This is similar to the splice covers as previously described except that one end has a smaller reduced section due to the fact that the pin is of a smaller diameter than the cable. Pin terminals are widely used for terminating aluminum cable in copper clamps. To avoid the galvanic action at the copper clamp, the pin is normally copper. Splice cover 63 serves the purpose of sealing moisture out of the junction area of the copper pin 37 with the aluminum body 58, and the juncture of the cable 59.

The splicing apparatus and technique described hereinabove may also be used for three-phase cables in a secondary voltage cable range (up to 1000 volts). Such a connection includes a three conductor splice with a neutral splice. However, the covers may also be used as components in 2, 3 and 4 conductor splices. In overseas markets, such conductor splices are commonly referred to as 2 core, 3 core and 4 core.

Figure 12:
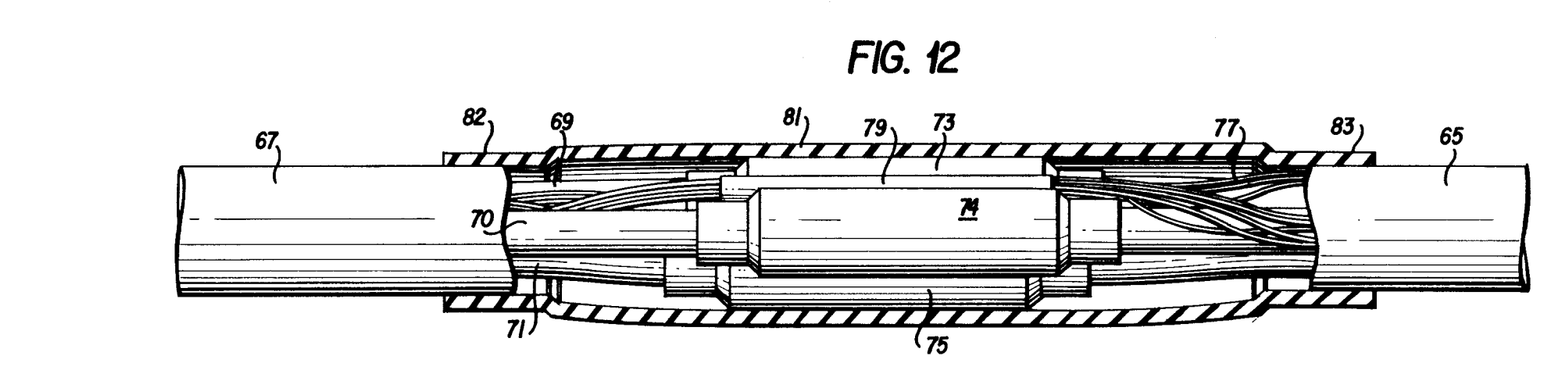
FIG. 12 is a partial sectional view of the splice covers used in the installation of three-phase cables with each cable being insulated.

FIG. 12 is a partial sectional view of such an arrangement. In this configuration there is shown a three conductor cable with a stranded neutral. The conductors and stranded neutral normally form a cable which is insulated as at 65 and 67. Each of the individual cables are also insulated as shown at 69, 70 and 71. Bare conductor wires for the neutral 77, in this particular instance, are not insulated. As shown therein, individual splices have been applied to each of the cables and splice covers 73, 74 and 75 of the type previously described. Additionally, splice 79 is shown as interconnecting the neutral bare wires 77. After the splices and splice covers are in place, an overall splice cover 81 having reduced end sections 82 and 83, of the same configuration as the other splice covers only larger, is used in order to provide a water tight seal about cables 65 and 69 and to provide contact with the interior splice covers in order to enhance thermal conductivity. Again, the present state-of-the-art for accomplishing this splicing and insulation uses heat shrinkable tubing as previously described.

It is to be understood that, in this multiconductor splicing, all known cables can be protected. They may be used with nonarmored cables and the multiple cores may be either segmental or round. Further, they may be used with steel taped armor cables or with the armor being steel stranded.

In the usage with the multiconductor splicing, the overall splice cover would also be included with the kit assembly. Additionally, if needed, a "continuity bond" may be included for continuing any fault current in the armor through the splice. Such continuity bond may be a strap that is clamped at the armor ends which can be either a solid steel strap or copper braid. Tension strap connector 111 is shown in FIG. 13.

Figure 13:
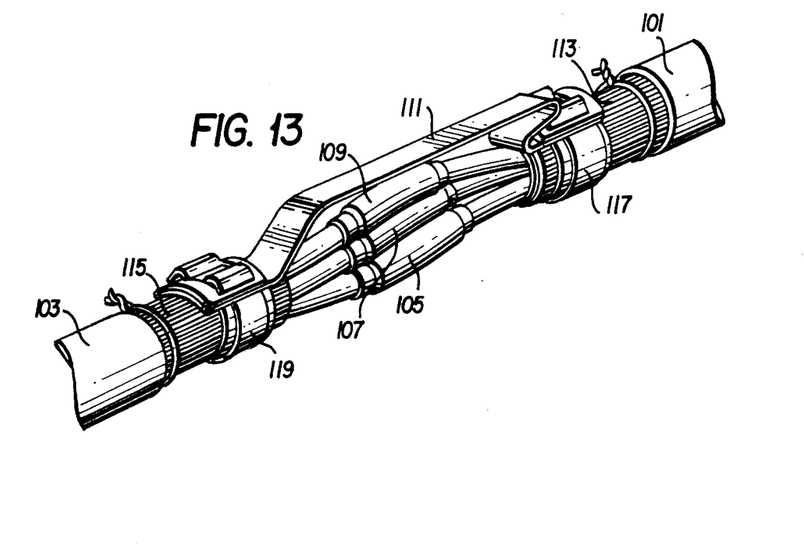
FIG. 13 is a perspective view of a 3-core cable connection using the splice covers of the present invention.

In FIG. 13, there is shown two 3-core insulated cables 101 and 103. The individual conductors are spliced in the standard manner and are covered with splice covers 105, 107 and 109 of the type previously described. Tension strap 111 is connected between cable sheathing 113 and 115 by means of clips 117 and 119. This is a common configuration in countries outside of the United States.

Figure 14:
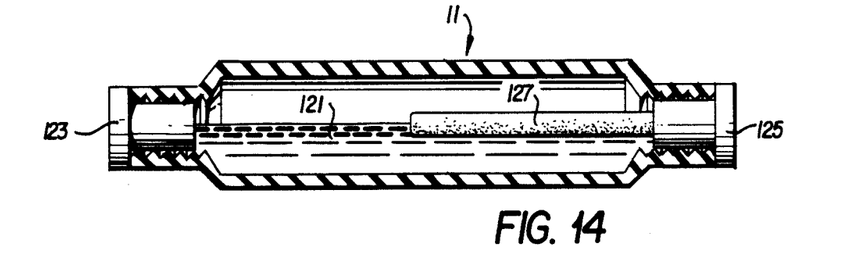
FIG. 14 is a sectional view of a modified lubricated splice cover.

FIG. 14 discloses a modified sleeve cover which may be used in the same manner as discussed above although the cover of FIG. 3 relates to the preferred embodiment. Basic cover 11 is the same as FIG. 1 and may incorporate the heat dissipating features of FIGS. 6 through 8. However, the lubricating medium is a fluid 121 such as silicone oil low viscosity grease, or the like which is the friction reducing material. Sleeve 11 is closed at one end by means such as plug 123 and filled with a predetermined amount of the fluid. In FIG. 14, the fluid is shown to fill the sleeve about 50 percent by volume. The other end of the sleeve is then closed by means of plug 125. It is preferred to attach a wick 127 of absorbent material, such as the material previously discussed, to one of the plugs so that it extends into the interior of cover 11.

When the splice cover is ready for use in the field, plugs 123 and 125 are removed and excess fluid is disposed of, leaving the interior of the sleeve coated with the friction reducing material. Additionally, plug 125 with attached wick 127 may be used as a dabber to coat the insulated cables.

It is to be understood that the plugs could be molded integrally with the cover by forming a flexible strap terminating in the plugs which could then be removably inserted into the ends of the cover. When the cover is to be used, the strap and plugs are then cut from the body of the cover.

Figure 15:
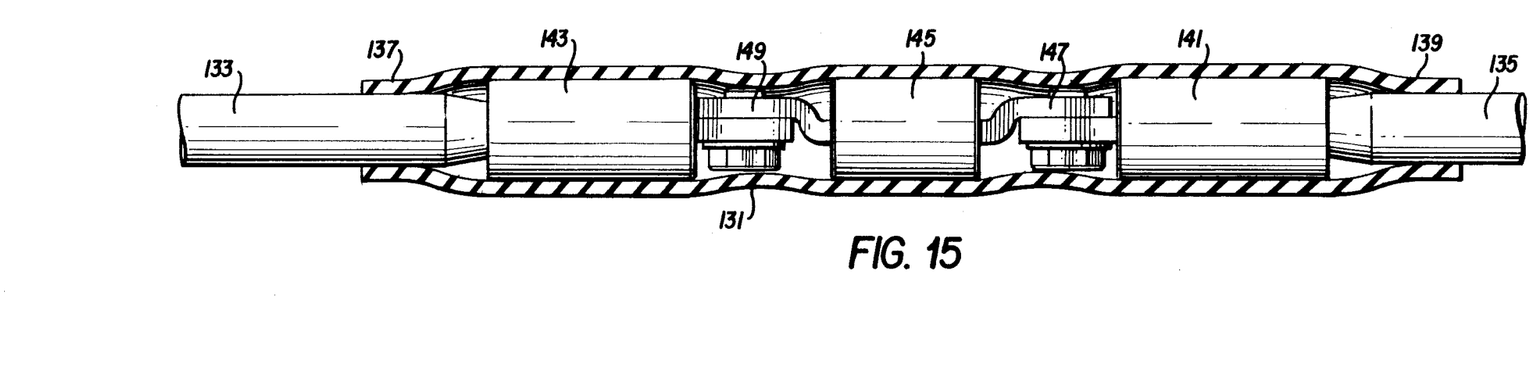
FIG. 15 is a sectional view of the cover of the present invention used with two terminals and an intermediate fuse.

FIG. 15 discloses the use of the cover of the present invention for a connection which includes a fuse. There is shown therein a splice cover 131, as previously discussed enclosing cables 133 and 135 at the ends 137, 139 of the cover. This illustration includes two terminals 141 and 143, such as that shown in FIG. 10 as previously described. A fuse 145 is connected intermediate of terminals 141 and 143 by means such as standard connectors 147 and 149. As will be obvious, the cover, when in position, firmly abuts against terminals 141 and 143 and, since the fuse is also of a greater diameter than the inside of the central part of cover 131, it also firmly encases such fuse element. Again, dissipation of heat is relatively high. Although some air space exists around the connectors 147 and 149, the effect is inconsequential since terminals 141 and 143 and fuse 145 effectively act as heat sinks to absorb the heat generated within the connector. Thus, the heat dissipation through the adjacent cover is very effective as previously discussed.

Figure 16:
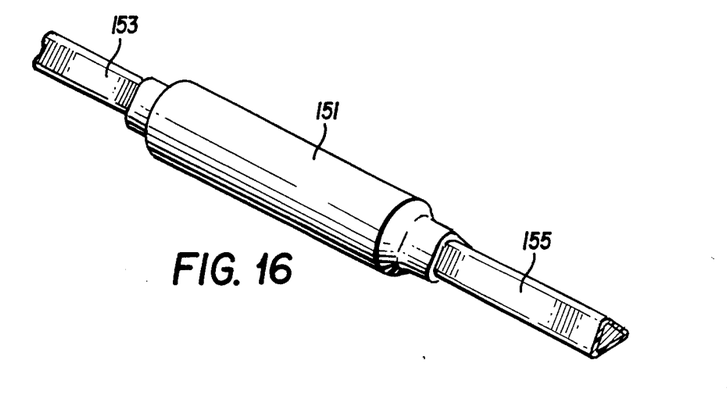
FIG. 16 is an illustration of the cover of the present invention used with a triangular segmental cable.

FIG. 16 is an illustration of use of sleeve 151 as previously described with triangular cables 153 and 155. While not generally used in the United States, this is a common type of cable used in the European countries. FIG. 15 illustrates that the cover is equally adaptable to such cables because of its inherent flexibility and, thus, is capabe of providing a watertight seal around the cables regardless of their shape.

As will now be evident, the present invention provides a reenterable lubricated splice cover for use with watertight splices which may include fuses. Additionally, the splice cover is geometrically configured relative to the splice so as to compensate for the higher ampacity now being used in that it provides a means for dissipating heat from and about the splice and fuse components. As a result, failure due to overheating within the splice area is substantially eliminated.

The above description and drawings are illustrative only since modifications may be made without departing from the invention, the scope of which is to be limited only by the following claims.

I claim:

1. A kit for joining insulated electrical cables comprising
   a deformable metal connector;
   a resilient open ended splice cover having a tubular central section and cable sealing means at both ends, said central section having an internal cross-sectional area smaller than the cross-sectional area of said metal connector;
   partially removable friction reducing material within said splice cover; and
   absorbent material within said splice cover for retaining said friction reducing material.

2. The apparatus of claim 1 wherein said absorbent material extends outwardly of said splice cover.

3. The apparatus of claim 1 further comprising tines integral with and extending longitudinal along the interior of said splice cover.

4. The apparatus of claim 1 further comprising
   ribs integral with and extending longitudinal along the exterior of said splice cover.

5. The apparatus of claim 1 further comprising
   a fuse interconnected with said metal splice, said fuse having a cross-sectional area greater than the internal cross-sectional area of the central section of said splice cover.

6. A kit for joining insulated electrical cables comprising
   a deformable metal connector;
   a resilient open ended splice cover having a tubular central section and cable sealing means at both ends, said central section having an internal cross-sectional are smaller than the cross-sectional area of said metal connector;
   partially removable friction reducing material within said splice cover; and
   removable plugs for sealing the ends of said splice cover.

7. The apparatus of claim 6 further comprising
   a wick of absorbent material secured to at least one of said plugs.

8. A splice cover for providing a watertight seal about a splice interconnecting electrical cables comprising
   a resilient elongated tube having a central section for enclosing a splice, said central section having an internal cross-sectional area smaller than the cross-sectional area of the splice to be covered, and reduced open end sections for sealing the ends of a portion of electrical cables to be spliced;

partially removable friction reducing material retained within said tube; and absorbent material within said tube for retaining said friction reducing material.

9. The cover of claim 8 further comprising tines integral with and extending longitudinally along the interior of said splice cover.

10. The cover of claim 8 further comprising ribs integral with and extending longitudinally along the exterior of said splice cover.

11. A splice cover for providing a watertight seal about a splice interconnecting electrical cables comprising a resilient elongated tube having a central section for enclosing a splice, said central section having an internal cross-sectional area smaller than the cross-sectional area of the splice to be covered, and reduced open end sections for sealing the ends of as portion of electrical cables to be spliced;

a lubricating fluid at least partially filling said tube; and removable plugs for sealing the ends of said tube.

12. A removable splice cover for providing a watertight seal about a splice interconnecting insulated electrical cables comprising a resilient elongated tube having a central section for enclosing a splice, said central section having an internal cross-sectional area smaller than the cross-sectional area of said splice, and reduced open end sections for sealing the ends of electrical cables to be spliced, said tube having a wall thickness at least as thick as the insulation on the cables to be spliced;

a friction reducing material within said tube;

removable plugs for sealing the ends of said tube.

13. A submersible cable and splice assembly comprising a main insulated electrical cable containing therein a plurality of insulated individual electrical cables, each of said cables being connected to a mating cable by a metal splice;

a resilient elongated tube having a central section for enclosing each of said splices, said central section of said tubes having an internal cross-sectional area smaller than the cross-sectional area of said splice, and reduced open end sections for sealing the ends of said individual electrical cables, said tubes having a wall thickness at least as thick as the insulation on said individual electrical cables to be spliced;

partially removable friction reducing material within said tube;

removable plugs for sealing the ends of said tubes; and a further reenterable flexible cover enclosing said individual cables, splices and tubes and sealing the ends of said main electrical cables.

14. A removable slice cover for providing a watertight seal about a splice interconnecting insulated electrical cables comprising a resilient elongated tube having a central section for enclosing a splice, said central section having an internal cross-sectional area smaller than the cross-sectional area of a splice to be covered, and reduced open end sections for sealing the ends of electrical cables to be spliced, said tube having a wall thickness at least as thick as the insulation on the cables to be spliced;

partially removable friction reducing material within said tube; and absorbent material within said tube for retaining said friction reducing material.

15. A submersible cable and splice assembly comprising a main insulated electrical cables containing therein a plurality of insulated individual electrical cables, each of said individual cables being connected to a mating cable by a metal splice;

a resilient elongated tube having a central section for enclosing each of said splices, said central section of said tubes having an internal cross-sectional area smaller than the cross-section area of said splice, and reduced open end sections for sealing the ends of said individual electrical cables, said tubes having a wall thickness at least as thick as the insulation on said individual electrical cables to be spliced;

partially removable friction reducing material within each of said tubes;

absorbent material with each of said tubes for retaining said friction reducing material; and a further reenterable flexible cover enclosing said individual cables, splices and tubes and sealing the ends of said main electrical cables.

* * * * *

UNITED STATES PATENT AND TRADEMARK OFFICE
CERTIFICATE OF CORRECTION

PATENT NO. : 4,837,409

DATED : June 6, 1989

INVENTOR(S) : John J. Klosin

It is certified that error appears in the above-identified patent and that said Letters Patent is hereby corrected as shown below:

On the title page item [21] should read as follows:

--Appln. No. 585,646--

Signed and Sealed this

Sixth Day of March, 1990

Attest:

JEFFREY M. SAMUELS

Attesting Officer

Acting Commissioner of Patents and Trademarks